(12) United States Patent
Tatsumi et al.

(10) Patent No.: US 9,422,933 B2
(45) Date of Patent: Aug. 23, 2016

(54) BELLOWS AND METHOD FOR MANUFACTURING SAME

(75) Inventors: Toshinori Tatsumi, Numazu (JP); Eiichi Takahashi, Numazu (JP)

(73) Assignee: MEIDENSHA CORPORATION, Tokyo (JP)

(*) Notice: Subject to any disclaimer, the term of this patent is extended or adjusted under 35 U.S.C. 154(b) by 199 days.

(21) Appl. No.: 14/117,950

(22) PCT Filed: Apr. 19, 2012

(86) PCT No.: PCT/JP2012/060559
§ 371 (c)(1),
(2), (4) Date: Nov. 15, 2013

(87) PCT Pub. No.: WO2012/157397
PCT Pub. Date: Nov. 22, 2012

(65) Prior Publication Data
US 2014/0083288 A1 Mar. 27, 2014

(30) Foreign Application Priority Data
May 18, 2011 (JP) .................................. 2011-111051

(51) Int. Cl.
F04B 45/02 (2006.01)
F16J 3/04 (2006.01)
H01G 5/01 (2006.01)
H01H 33/662 (2006.01)
H01G 5/014 (2006.01)

(52) U.S. Cl.
CPC ................. *F04B 45/02* (2013.01); *F16J 3/041* (2013.01); *F16J 3/047* (2013.01); *H01G 5/01* (2013.01); *H01G 5/014* (2013.01); *H01H 33/66238* (2013.01); *Y10T 29/49877* (2015.01)

(58) Field of Classification Search
CPC ............ F04B 45/02; F16J 3/04; F16J 3/041; F16J 3/047

USPC ............................................................ 92/34
See application file for complete search history.

(56) References Cited

U.S. PATENT DOCUMENTS 3,626,582 A * 12/1971 Melill .................... B23K 20/00
228/193
3,748,722 A * 7/1973 Moore ................... B23K 20/14
228/193

(Continued)

FOREIGN PATENT DOCUMENTS

| JP | 4-157172 A | 5/1992 |
| JP | 4-157195 A | 5/1992 |
| JP | 6-204084 | 7/1994 |

(Continued)

*Primary Examiner* — Thomas E Lazo
(74) *Attorney, Agent, or Firm* — Foley & Lardner LLP

(57) ABSTRACT

A conductive coating layer 2a, 2b is formed on at least one of an inner peripheral side and an outer peripheral side of a base body 2 of bellows 1 by diffusion-bonding. Regarding the diffusion-bonding, the flat conductive coating layer 2a, 2b is layered on at least one end surface side of the plate-shaped base body 2, and these base body 2 and conductive coating layer 2a, 2b are diffusion-bonded. After forming this diffusion-bonded multilayer member into a tubular body by a drawing process, a side wall of the tubular body is formed into a bellows shape. With these processes, it is possible to obtain the bellows that has the conductive coating layer having a more uniform thickness on the base body of the bellows and has extremely good characteristics (the mechanical characteristics and the electric characteristics).

8 Claims, 2 Drawing Sheets

(56) References Cited

U.S. PATENT DOCUMENTS

| | | | | |
|---|---|---|---|---|
| 3,996,019 A | * | 12/1976 | Cogan | B23K 20/00 228/193 |
| 6,587,328 B2 | * | 7/2003 | Bigler | H01G 5/00 361/279 |
| 2002/0159221 A1 | | 10/2002 | Bigler et al. | |

FOREIGN PATENT DOCUMENTS

| | | |
|---|---|---|
| JP | 7-78729 A | 3/1995 |
| JP | 10-30159 A | 2/1998 |
| JP | 3264006 B2 | 3/2002 |
| JP | 2010-53415 A | 3/2010 |
| JP | 2010-245552 A | 10/2010 |

* cited by examiner

BELLOWS AND METHOD FOR MANUFACTURING SAME

TECHNICAL FIELD

The present invention relates to bellows and a method for manufacturing the same, which are connected with, for instance, a vacuum capacitor, a vacuum switch, a vacuum relay, a vacuum interrupter, etc. each having a vacuum casing.

BACKGROUND ART

For instance, the bellows (bellows formed from a base body whose side wall has a bellows shape) used for the vacuum capacitor is provided to serve as a current path between a movable conductor in the vacuum casing of the vacuum capacitor and one end side (a metal member) of the vacuum casing and also to divide an inside of the vacuum casing into a vacuum chamber and an atmospheric chamber then to keep the vacuum chamber airtight.

Although also a structure in which a plurality of bellows (e.g. stainless bellows and copper bellows) are used and these bellows are arranged parallel to each other at a certain distance in the vacuum casing has been known (for instance, Patent Document 1), in view of market demand of space-saving, size reduction, etc. nowadays, it is desirable that the bellows having good characteristics (such as mechanical characteristics and electric characteristics) should be used singly.

As a method for improving the characteristics of the bellows, a method for improving the electric characteristics by forming a conductive coating layer on a surface of the bellows-shaped base body (such as stainless steel) by plating (e.g. plating with copper) has been known. In the case where the base body formed from the stainless steel is plated with the copper etc., as a pretreatment process, a surface treatment (a mid-plating process) by nickel plating is performed.

Further, a method, in which bellows-shaped base body formed from beryllium copper is used and a brazing portion of the bellows is plated with copper or plated with nickel, has been also known (for instance, Patent Document 2).

However, the plating process of the bellows-shaped base body requires an expert special process, and consignees also decreases and it is difficult to get the expert special process. In addition, under present circumstances, a manufacturing yield is low, thus the plating process of the bellows-shaped base body is not a high-productivity manner.

Further, since the nickel in itself is magnetic material and the nickel acts as a part of a heat generating source upon power supply in use of the vacuum capacitor or a high frequency power application (a high frequency voltage-application), this could affect characteristics or performance of products. Furthermore, the beryllium copper is inferior in a lifetime characteristic (a metal fatigue rupture characteristic due to continuous expansion and contraction under a heat load) to stainless base material (SUS304L etc.).

In a case where an electroplating process with the copper or silver is performed with the aim of improving a high-frequency characteristic and a high electric conductivity characteristic, its plating thickness (a conductive coating layer thickness) is prone to non-uniform. Further, there is a tendency for the uniformity of the plating thickness to deteriorate with increase of the plating thickness (there is an inverse proportion between the plating thickness and the uniformity of the plating thickness). As a consequence, variations in a total thickness of the whole of the bellows and a mechanical strength distribution occur. For instance, in the case of the use in which the bellows repeatedly expands and contracts like the vacuum capacitor, there is a risk that the metal fatigue rupture will easily occur. Moreover, since a cross-sectional area of the power application (or the voltage application) becomes non-uniform (the cross-sectional area of the power application increases or decreases), there is a possibility that heat value upon the power supply will increase.

For these reasons, studies to readily form the conductive coating layer on the bellows and to make the conductive coating layer thickness as uniform as possible have been done. For example, a cylindrical base body (a base body before being shaped into the bellows) is plated by electroplating, or the conductive coating layer is formed, for instance, by fitting an extremely thin coating tube (a thickness is about 100~200 µm) onto the base body so as to cover an outer peripheral side of the base body, and after that, by forming the base body into a desired shape, the bellows is obtained. Such method for obtaining the bellows has been studied (for instance, Patent Document 3).

However, even though the base body are molded or shaped after the electroplating in the method, the conductive coating layer thickness is not a little non-uniform (a variation of an average ±10%). Further, in the method in which the coating tube is merely fitted, for instance, a difference in deformation or strain between the base body and the conductive coating layer arises when forming the base body into the desired shape. Thus, in view of the mechanical strength such as the rupture, since this method is an extraordinarily difficult manufacturing process, the realization is low.

Here, although a technical field is different from the bellows of the vacuum capacitor, with regard to a feeding roll, a sheet member is wrapped around a cylindrical base body, and both edges of the sheet member are tacked by welding, then these base body and sheet member are diffusion-bonded. Such technique has been known (for instance, Patent Document 4).

In view of the foregoing, an object of the present invention is to find a different method from the above mentioned method in which after forming the conductive coating layer on the cylindrical base body, the base body is formed into the desired shape, and to obtain the bellows that has the conductive coating layer having a more uniform thickness and has extremely good characteristics (the mechanical characteristics and the electric characteristics).

CITATION LIST

Patent Document

Patent Document 1: Japanese Patent Application Publication No. JP7-78729
Patent Document 2: Japanese Patent No. JP3264006
Patent Document 3: Japanese Patent Application Publication No. JP2010-245552
Patent Document 4: Japanese Patent Application Publication No. JP2010-53415

SUMMARY OF THE INVENTION

The present invention is a technical idea produced in order to solve the above problems. According to one aspect of the present invention, a method for manufacturing bellows comprises: arranging a flat conductive coating layer on at least one end surface side of a plate-shaped base body in layer; diffusion-bonding the base body and the conductive coating layer; forming a diffusion-bonded multilayer member into a tubular body by a drawing process; and forming a side wall of the tubular body into a bellows shape.

The base body could be formed from a nonmagnetic stainless material. The conductive coating layer could be formed from a conductive material that contains at least one of copper, silver and gold.

According to another aspect of the present invention, a method for manufacturing bellows that divides an inside of a vacuum casing into a vacuum chamber and an atmospheric chamber and keeps the vacuum chamber airtight, the method comprises: forming a tubular base body, an inner peripheral side and an outer peripheral side of which are coated with a conductive coating layer by diffusion-bonding, into a bellows shape.

According to a further aspect of the invention, bellows for a vacuum casing, which divides an inside of the vacuum casing into a vacuum chamber and an atmospheric chamber and keeps the vacuum chamber airtight, comprises: a base body to which a conductive coating layer is diffusion-bonded.

The bellows could be manufactured by any one of the above methods.

In a technical field of the bellows used in the vacuum casing, the method, like the related art, in which the cylindrical base body undergoes the mid-plating process or the conductive coating layer is formed by fitting the coating tube onto the cylindrical base body, has been known. However, there has not been the technical idea of, after forming the conductive coating layer on the base body by the diffusion-bonding, forming the multilayer member of these base body and conductive coating layer into the desired shape by the drawing process.

According to the bellows and the method for manufacturing the bellows of the present invention, it is possible to obtain the bellows that has the conductive coating layer having the more uniform thickness on the base body of the bellows and has the extremely good characteristics (the mechanical characteristics and the electric characteristics).

EMBODIMENTS FOR CARRYING OUT THE INVENTION

Figure 1:
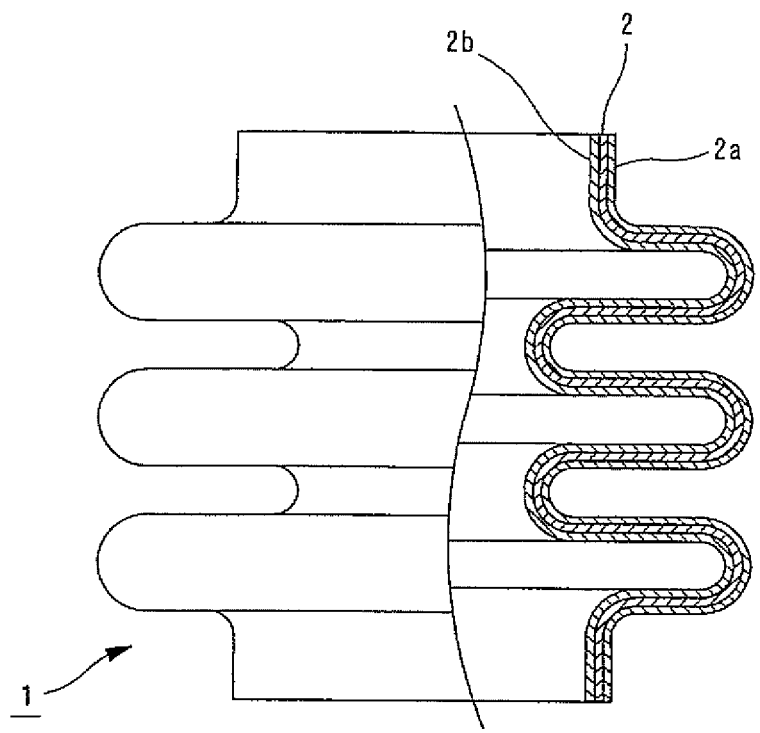
FIG. 1 is a schematic diagram for explaining an example of bellows of the present embodiment.

As bellows and a method for manufacturing the bellows according to an embodiment of the present invention, a base body and a conductive coating layer are layered by diffusion bonding, then the bellows is obtained. Such method for obtaining the bellows is not a method, like the related art, in which the mid-plating process is performed or the base body is formed into the desired shape after forming the conductive coating layer on the cylindrical base body, but is a relatively simple method. For instance, the conductive coating layer is layered on at least one end surface side of a plate-shaped base body (or a flat base body), and these base body and conductive coating layer are diffusion-bonded. Subsequently, this diffusion-bonded multilayer member is formed into a tubular body (e.g. a cylindrical body) by a drawing process, then a side wall of the tubular body is formed or molded into a bellows shape.

In the case, like the present embodiment, where the conductive coating layer is layered on the base body of the bellows by the diffusion bonding, for instance, as compared with the case where the conductive coating layer is formed by plating the cylindrical base body, a thickness of the conductive coating layer becomes more uniform (there is almost no variation, or at least an average ±1% or less).

Here, assuming that Patent Document 4 can be applied to the bellows, since the technique of Patent Document 4 is the method in which the sheet member is wrapped around the tubular body and the both edges of the sheet member are welded then the tubular body and the sheet member are diffusion-bonded, a joint (or a joint line or a seam) remains on the conductive coating layer on an outer peripheral side of the bellows. Because of this joint, the thickness of the conductive coating layer becomes non-uniform (a thickness of the joint is different from that of a part except the joint), then electric characteristics deteriorate due to a difference of a resistivity of the joint. Further, with regard to the welding of the edge at a tubular inner peripheral side, in a case where a diameter of the tubular body is small (for instance, φ50 or smaller), the edge welding is difficult. Here, Patent Document 4 is concerned with the feeding roll, and it is conceivable that an influence by the joint (an influence in a case where the conductive coating layer of Patent Document 4 is used in the vacuum casing) is not estimated at all.

On the other hand, in the case, like the present embodiment, where the multilayer member formed by the diffusion bonding undergoes the drawing process, no joint remains, and the bellows that has the conductive coating layer having the uniform thickness can be obtained.

As the bellows and the method for manufacturing the bellows according to the present embodiment, as described above, as long as the multilayer member formed by the diffusion bonding of the base body and the conductive coating layer can be formed into the desired shape by the drawing process, a variety of shapes can be made by applying technical knowledge based on the bellows that is obtained as the object.

<Base Body>

For instance, as the base body, material that can undergo the drawing process among materials generally used for the bellows of the vacuum capacitor can be used. For example, it is a nonmagnetic stainless material (such as SUS304, SUS316 and each of SS materials). However, the base body is not limited to these materials.

<Conductive Coating Layer>

As the conductive coating layer, various conductive materials can be used as long as the materials can be diffusion-bonded to the base body. For example, it is a conductive material that contains copper, silver, gold, etc. each having a high conductivity. However, in a case where the base body is formed from a low corrosion-resistant material, it is desirable to use a conductive material having corrosion-resistance.

As the thickness of the conductive coating layer, it can be set as necessary, for instance, according to frequency of power that is applied to the conductive coating layer. Ina case of the vacuum capacitor products of frequency 100 MHz, 60 MHz and 13 MHz which are present in a recent market, the thickness of the conductive coating layer could be set to 7 μm or greater, 9 μm or greater and 18 μm or greater respectively. Here, in a case where the conductive coating layer is applied to equipment of a relatively low frequency, the thickness of the conductive coating layer could be set to be thicker (the thickness is set to several tens of μm~several hundred μm level for the frequency several MHz~several hundred kHz level). For instance, the thickness is set to 70 μm, 210 μm for the frequency 1 MHz, 100 kHz respectively.

<Diffusion Bonding>

With respect to the diffusion bonding, its method is not limited as long as the base body and the conductive coating layer are brought into tight contact with each other then the both are bonded by atomic diffusion. For instance, it is a method in which the conductive coating layer is formed on the one end surface side of the plate-shaped base body by coating the one end surface side of the plate-shaped base body with the conductive material, and both the base body and the conductive coating layer are bonded by a heating treatment at a temperature of a melting point of the base body or lower while pressing the multilayer member in a direction of an interface between the plate-shaped base body and the conductive coating layer.

Here, in the case where the conductive coating layer is formed on only the one end surface side of the base body, a difference of coefficient of thermal expansion between the both arises (which is caused by different materials), that is, a difference of the thermal expansion coefficient between an inner peripheral side and an outer peripheral side of the bellows arises. Then, if the difference of the thermal expansion coefficient is great, there is a possibility that a warp or a curve will occur. Because of this, for instance, as shown in FIG. 1, it is preferable to form the bellows 1 that has the same kind of conductive coating layers 2a and 2b on an inner peripheral side and an outer peripheral side of the base body 2 then to suppress the phenomenon of the warp caused by the difference of the thermal expansion coefficient. Here, with regard to the conductive coating layers 2a and 2b, they are not limited to a single layer structure. Each of the conductive coating layers 2a and 2b could be a multilayer structure.

<Molding>

Figure 2:
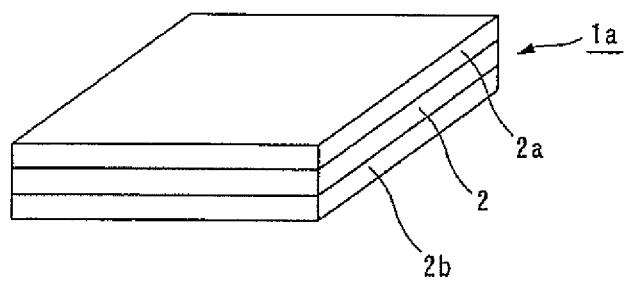
FIG. 2 is a schematic diagram for explaining an example of multilayer member applied to the bellows of the present embodiment.

After the tubular body is obtained by performing the drawing process of the multilayer member formed from the base body and the conductive coating layer, the side wall of the tubular body is formed or molded into the bellows shape. As this method, a various kind of methods can be applied. For example, as shown in FIG. 2, the conductive coating layers 2a and 2b are formed on the both end surfaces of the plate-shaped base body 2 then the multilayer member 1a is obtained, and by performing the drawing process of the multilayer member 1a, the cylindrical body is formed. Further, by forming or molding the side wall of this cylindrical body into the bellows shape (so as to be able to expand and contract), the bellows as shown in FIG. 1 can be obtained.

<Example of Application of Bellows>

Figure 3:
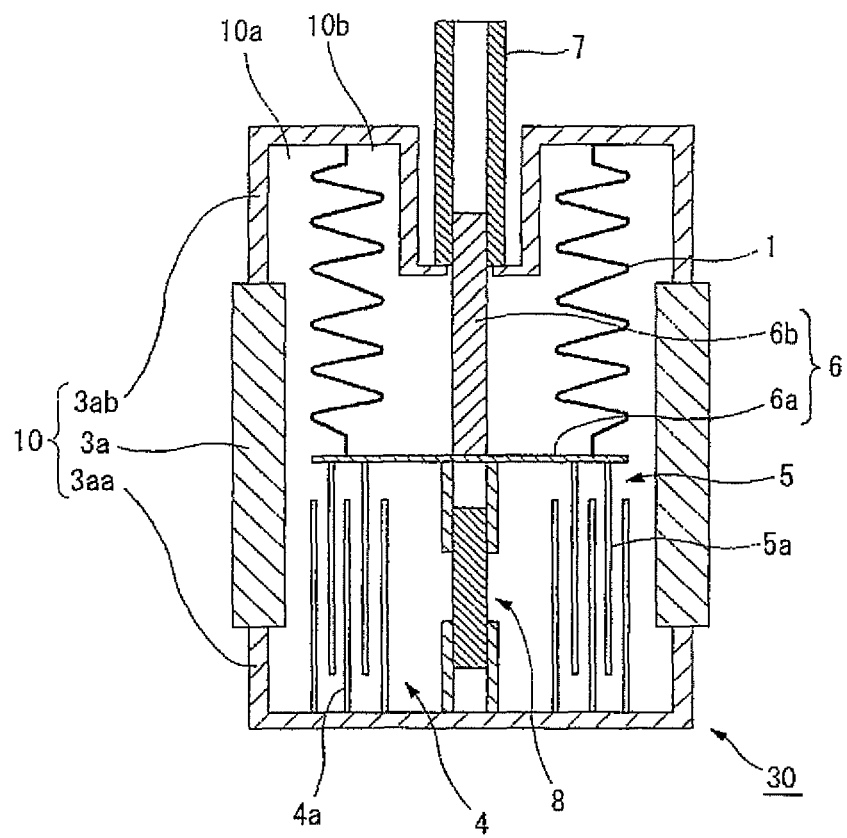
FIG. 3 is a schematic diagram for explaining an example of a vacuum capacitor employing the bellows of the present embodiment.

As described above, for example, as denoted by a reference sign 1 in FIG. 3, the bellows is applied to a vacuum capacitor 30 having a vacuum casing 10 in which a fixed electrode 4 and a movable electrode 5 are arranged. The bellows is provided extendably or retractably (or so as to expand and contract) to divide an inside of the vacuum casing 10 into a vacuum chamber 10a and an atmospheric chamber 10b and to keep the vacuum chamber 10a airtight.

In FIG. 3, the vacuum casing 10 is formed by providing an insulation tube body 3a and seal members 3aa, 3ab made of insulation material and closing both opening end sides of the insulation tube body 3a by the seal members 3aa, 3ab.

The fixed electrode 4 is formed by concentrically arranging a plurality of substantially cylindrical electrode members 4a, each of which has a different diameter (for instance, by arranging the electrode members 4a at regular intervals). The fixed electrode 4 is provided at one side (at the seal member 3aa in FIG. 3) of the seal members on an inner peripheral side of the vacuum casing 10.

In the same manner as the fixed electrode 4, the movable electrode 5 is formed by concentrically arranging a plurality of substantially cylindrical electrode members 5a, each of which has a different diameter (for instance, by arranging the electrode members 5a at regular intervals). The movable electrode 5 is disposed in the vacuum chamber 10a so that each electrode member 5a can be inserted into and extracted from a gap between the electrode members 4a of the fixed electrode 4 (so that the electrode members 5a alternately overlap the electrode members 4a of the fixed electrode 4 by the insertion of each electrode member 5a into the gap between the electrode members 4a of the fixed electrode 4) with each electrode member 5a in noncontact with the electrode members 4a of the fixed electrode 4. This movable electrode 5 is supported by a movable electrode shaft 6 that can move in an axial direction of the vacuum casing 10 (so as to be able to adjust a degree of the insertion/extraction of the movable electrode 5 into/from the fixed electrode 4).

The movable electrode shaft 6 is formed from a support member 6a to support the movable electrode 5 and a movable rod 6b provided so as to extend from a back of the support member 6a and protrude from the seal member 3ab.

A reference sign 7 indicates a capacitance control unit that is rotatably supported through a supporting member (not shown) formed by a thrust bearing etc. and rotates with respect to the vacuum casing 10 by a drive source such as a motor. The capacitance control unit 7 is connected to the movable rod 6b by being screwed onto an end portion, which protrudes from the seal member 3ab, of the movable rod 6b (for instance, a female part formed at the capacitance control unit 7 is screwed onto a male screw part formed at one end side of the movable rod 6b).

A reference sign 8 indicates an insulation guide that guides the movable electrode 5 so that the movable electrode 5 and the fixed electrode do not contact each other.

With regard to the bellows 1, an edge at one end side of the bellows 1 is connected to an inner wall side of the seal member 3ab and an edge at the other end side of the bellows 1 is connected to the support member 6a so as to divide the inside of the vacuum casing 10 into the vacuum chamber 10a and the atmospheric chamber 10b and to keep the vacuum chamber 10a airtight. As a connecting manner of the bellows 1, for instance, it is a brazing in a vacuum condition.

Although only the embodiment described above in the present invention has been explained in detail, it is obvious to a person skilled in the art that modifications and variations of the embodiment can be possible within a scope of technical idea of the present invention. It is right that these modifications and variations are included in the scope of the claims.

For instance, although the vacuum capacitor is described as the example of the application of the bellows, the bellows can be applied to a vacuum switch, a vacuum relay, a vacuum interrupter, etc. each having the vacuum casing.

EXPLANATION OF REFERENCE

1 . . . bellows
1a . . . multilayer member
2 . . . base body 2a, 2b . . . conductive coating layer
10 . . . vacuum casing
30 . . . vacuum capacitor

The invention claimed is:

1. A method for manufacturing bellows comprising:
   arranging a flat conductive coating layer on at least one end surface side of a plate-shaped base body in layer;
   diffusion-bonding the base body and the conductive coating layer;
   forming a diffusion-bonded multilayer member into a tubular body by a drawing process; and
   forming a side wall of the tubular body into a bellows shape.

2. The method for manufacturing the bellows as claimed in claim 1, wherein:
   the base body is formed from a nonmagnetic stainless material.

3. The method for manufacturing the bellows as claimed in claim 1, wherein:
   the conductive coating layer is formed from a conductive material that contains at least one of copper, silver and gold.

4. Bellows manufactured by the method of claim 1.

5. Bellows for a vacuum casing, which divides an inside of the vacuum casing into a vacuum chamber and an atmospheric chamber and keeps the vacuum chamber airtight, comprising:
   a base body; and
   a conductive coating layer,
   wherein the base body and the conductive coating layer are bonded by diffusion-bonding, and
   wherein a thickness of the conductive coating layer is uniform.

6. The bellows for the vacuum casing as claimed in claim 5, wherein:
   a variation of the thickness of the conductive coating layer is an average of ±1% or less.

7. Bellows for a vacuum casing, which divides an inside of the vacuum casing into a vacuum chamber and an atmospheric chamber and keeps the vacuum chamber airtight, comprising:
   a base body;
   a conductive coating layer; and
   a diffusion-bond configured to bond the base body and the conductive coating layer,
   wherein a thickness of the conductive coating layer is uniform.

8. The bellows for the vacuum casing as claimed in claim 7, wherein:
   a variation of the thickness of the conductive coating layer is an average of ±1% or less.

* * * * *